US012573344B1

(12) United States Patent
Zhang

(10) Patent No.: US 12,573,344 B1
(45) Date of Patent: Mar. 10, 2026

(54) PIXEL CIRCUIT, DISPLAY PANEL AND DISPLAY DEVICE

(71) Applicants: Wuhan Tianma MicroElectronics Co., Ltd. Shanghai Branch., Shanghai (CN); Wuhan Tianma Micro-Electronics Co., Ltd., Wuhan (CN)

(72) Inventor: Mengmeng Zhang, Shanghai (CN)

(73) Assignees: Wuhan Tianma MicroElectronics Co., Ltd. Shanghai Branch., Shanghai (CN); Wuhan Tianma Micro-Electronics Co., Ltd., Wuhan (CN)

( * ) Notice: Subject to any disclaimer, the term of this patent is extended or adjusted under 35 U.S.C. 154(b) by 0 days.

(21) Appl. No.: 19/074,786

(22) Filed: Mar. 10, 2025

(30) Foreign Application Priority Data

Dec. 19, 2024 (CN) ........................ 202411887131.6

(51) Int. Cl.
*G09G 3/3233* (2016.01)

(52) U.S. Cl.
CPC ..... *G09G 3/3233* (2013.01); *G09G 2300/043* (2013.01); *G09G 2300/0819* (2013.01); *G09G 2300/0842* (2013.01); *G09G 2320/0233* (2013.01); *G09G 2320/0247* (2013.01)

(58) Field of Classification Search
CPC ..... G09G 2300/043; G09G 2300/0819; G09G 2300/0842; G09G 2320/0233; G09G 2320/0247
USPC .................................................... 345/204, 76
See application file for complete search history.

(56) References Cited

U.S. PATENT DOCUMENTS

| | | | | |
|---|---|---|---|---|
| 2012/0019504 A1* | 1/2012 | Han | G09G 3/3233 345/212 |
| 2021/0248961 A1* | 8/2021 | Yang | G09G 3/3266 |
| 2021/0280652 A1* | 9/2021 | Kim | H10D 30/0314 |
| 2022/0069044 A1* | 3/2022 | Kwak | H10K 59/1213 |
| 2023/0386376 A1* | 11/2023 | Kim | G09G 3/006 |

* cited by examiner

*Primary Examiner* — Jimmy H Nguyen
(74) *Attorney, Agent, or Firm* — Anova Law Group, PLLC

(57) ABSTRACT

A pixel circuit includes a driving transistor, a threshold compensation transistor, and a shielding layer. The threshold compensation transistor includes first and second sub-threshold compensation transistors. First electrode of the first sub-threshold compensation transistor is connected to gate of the driving transistor. Second electrode of the first sub-threshold compensation transistor is connected to first electrode of the second sub-threshold compensation transistor. Second electrode of the second sub-threshold compensation transistor is connected to first electrode of the driving transistor. Gate of the first sub-threshold compensation transistor and gate of the second sub-threshold compensation transistor are connected. Active layer of the threshold compensation transistor includes first sub-channel region, second sub-channel region, first connection region. The first sub-channel region at least partially overlaps the gate of the first sub-threshold compensation transistor. The second sub-channel region at least partially overlaps the gate of the second sub-threshold compensation transistor.

20 Claims, 11 Drawing Sheets

PIXEL CIRCUIT, DISPLAY PANEL AND DISPLAY DEVICE

CROSS-REFERENCE TO RELATED APPLICATION

The present disclosure claims priority of Chinese Patent Application No. 202411887131.6, filed on Dec. 19, 2024, the entire content of which is hereby incorporated by reference.

FIELD OF THE DISCLOSURE

The present disclosure generally relates to the field of display panel technology and, more particularly, relates to a pixel circuit, a display panel and a display device.

BACKGROUND

In existing technology, a display panel includes a pixel circuit, and the pixel circuit is configured to drive a light-emitting device to emit light. The light-emitting device may be an organic light-emitting diode (OLED). Compared with a traditional liquid crystal display panel with a thin-film transistor, an OLED display panel may have technical advantages including low energy consumption, self-luminescence, fast response speed, wide color gamut, large viewing angle, high brightness and easy application of flexible display technology, and has gradually become the mainstream display technology for mobile phones, televisions, computers and other displays. Since an OLED device is current-driven, an OLED display panel is usually driven by current. When an OLED panel emits light, the driving transistor in the pixel circuit needs to be controlled to provide driving current to the OLED device to make the OLED device to emit light.

In an existing display panel, when a part of the modules is turned off, the potential of the control terminal of the driving module may be unstable, resulting in changes in the display brightness of the light-emitting module. Especially in low-frequency display, an image displayed may have flickering phenomena (flicker) at different levels, and display effect of the display panel may thus be affected.

SUMMARY

One aspect of the present disclosure includes a pixel circuit. The pixel circuit includes a driving transistor, a threshold compensation transistor, and a shielding layer. The threshold compensation transistor includes a first sub-threshold compensation transistor and a second sub-threshold compensation transistor. A first electrode of the first sub-threshold compensation transistor is electrically connected to a gate of the driving transistor, a second electrode of the first sub-threshold compensation transistor is electrically connected to a first electrode of the second sub-threshold compensation transistor, a second electrode of the second sub-threshold compensation transistor is electrically connected to a first electrode of the driving transistor, and a gate of the first sub-threshold compensation transistor and a gate of the second sub-threshold compensation transistor are electrically connected. An active layer of the threshold compensation transistor includes a first sub-channel region, a second sub-channel region, and a first connection region, wherein the first sub-channel region and the second sub-channel region are electrically connected through the first connection region. In a direction perpendicular to the active layer of the threshold compensation transistor, the first sub-channel region at least partially overlaps with the gate of the first sub-threshold compensation transistor, and the second sub-channel region at least partially overlaps with the gate of the second sub-threshold compensation transistor. An overlapping area A of the first connection area and the shielding layer satisfies:

$$A > C_{p1} * \left( \frac{|V_{g1} - V_{01}|}{N1 + a1 - V_{01}} - 1 \right) * \frac{d1}{\varepsilon 1},$$

$$C_{p1} = C_{ox1} * \left( \frac{W1 * L1}{2} + \frac{W2 * L2}{2} \right),$$

where: Cox1 is a capacitance per unit area of a metal-insulator-semiconductor (MIS) structure of the threshold compensation transistor; V01 is a gate potential of the driving transistor before the threshold compensation transistor is turned off; d1 is a thickness of the insulation layer between the shielding layer and the first connection area, ε1 is a relative dielectric constant of the insulation layer between the shielding layer and the first connection area; N1 is a gate potential of the driving transistor before the pixel circuit drives the pixel to emit light; Vg1 is a gate potential of the threshold compensation transistor after the threshold compensation transistor is turned off; a1 is a preset constant; W1 is a channel width of the first sub-threshold compensation transistor; L1 is a channel length of the first sub-threshold compensation transistor; W2 is a channel width of the second sub-threshold compensation transistor; and L2 is a channel length of the second sub-threshold compensation transistor.

Another aspect of the present disclosure includes a display panel. The display panel includes a pixel circuit. The pixel circuit includes a driving transistor, a threshold compensation transistor, and a shielding layer. The threshold compensation transistor includes a first sub-threshold compensation transistor and a second sub-threshold compensation transistor. A first electrode of the first sub-threshold compensation transistor is electrically connected to a gate of the driving transistor, a second electrode of the first sub-threshold compensation transistor is electrically connected to a first electrode of the second sub-threshold compensation transistor, a second electrode of the second sub-threshold compensation transistor is electrically connected to a first electrode of the driving transistor, and a gate of the first sub-threshold compensation transistor and a gate of the second sub-threshold compensation transistor are electrically connected. An active layer of the threshold compensation transistor includes a first sub-channel region, a second sub-channel region, and a first connection region, wherein the first sub-channel region and the second sub-channel region are electrically connected through the first connection region. In a direction perpendicular to the active layer of the threshold compensation transistor, the first sub-channel region at least partially overlaps with the gate of the first sub-threshold compensation transistor, and the second sub-channel region at least partially overlaps with the gate of the second sub-threshold compensation transistor. An overlapping area A of the first connection area and the shielding layer satisfies:

$$A > C_{p1} * \left( \frac{|V_{g1} - V_{01}|}{N1 + a1 - V_{01}} - 1 \right) * \frac{d1}{\varepsilon 1},$$

-continued $$C_{p1} = C_{ox1} * \left(\frac{W1 * L1}{2} + \frac{W2 * L2}{2}\right),$$

where: Cox1 is a capacitance per unit area of a metal-insulator-semiconductor (MIS) structure of the threshold compensation transistor; V01 is a gate potential of the driving transistor before the threshold compensation transistor is turned off; d1 is a thickness of the insulation layer between the shielding layer and the first connection area, ε1 is a relative dielectric constant of the insulation layer between the shielding layer and the first connection area; N1 is a gate potential of the driving transistor before the pixel circuit drives the pixel to emit light; Vg1 is a gate potential of the threshold compensation transistor after the threshold compensation transistor is turned off; a1 is a preset constant; W1 is a channel width of the first sub-threshold compensation transistor; L1 is a channel length of the first sub-threshold compensation transistor; W2 is a channel width of the second sub-threshold compensation transistor; and L2 is a channel length of the second sub-threshold compensation transistor.

Another aspect of the present disclosure includes a display device. The display panel includes a display panel. The display panel includes a pixel circuit. The pixel circuit includes a driving transistor, a threshold compensation transistor, and a shielding layer. The threshold compensation transistor includes a first sub-threshold compensation transistor and a second sub-threshold compensation transistor. A first electrode of the first sub-threshold compensation transistor is electrically connected to a gate of the driving transistor, a second electrode of the first sub-threshold compensation transistor is electrically connected to a first electrode of the second sub-threshold compensation transistor, a second electrode of the second sub-threshold compensation transistor is electrically connected to a first electrode of the driving transistor, and a gate of the first sub-threshold compensation transistor and a gate of the second sub-threshold compensation transistor are electrically connected. An active layer of the threshold compensation transistor includes a first sub-channel region, a second sub-channel region, and a first connection region, wherein the first sub-channel region and the second sub-channel region are electrically connected through the first connection region. In a direction perpendicular to the active layer of the threshold compensation transistor, the first sub-channel region at least partially overlaps with the gate of the first sub-threshold compensation transistor, and the second sub-channel region at least partially overlaps with the gate of the second sub-threshold compensation transistor. An overlapping area A of the first connection area and the shielding layer satisfies:

$$A > C_{p1} * \left(\frac{|V_{g1} - V_{01}|}{N1 + a1 - V_{01}} - 1\right) * \frac{d1}{\varepsilon 1},$$

$$C_{p1} = C_{ox1} * \left(\frac{W1 * L1}{2} + \frac{W2 * L2}{2}\right),$$

where: Cox1 is a capacitance per unit area of a metal-insulator-semiconductor (MIS) structure of the threshold compensation transistor; V01 is a gate potential of the driving transistor before the threshold compensation transistor is turned off; d1 is a thickness of the insulation layer between the shielding layer and the first connection area, ε1 is a relative dielectric constant of the insulation layer between the shielding layer and the first connection area; N1 is a gate potential of the driving transistor before the pixel circuit drives the pixel to emit light; Vg1 is a gate potential of the threshold compensation transistor after the threshold compensation transistor is turned off; a1 is a preset constant; W1 is a channel width of the first sub-threshold compensation transistor; L1 is a channel length of the first sub-threshold compensation transistor; W2 is a channel width of the second sub-threshold compensation transistor; and L2 is a channel length of the second sub-threshold compensation transistor.

Other aspects of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
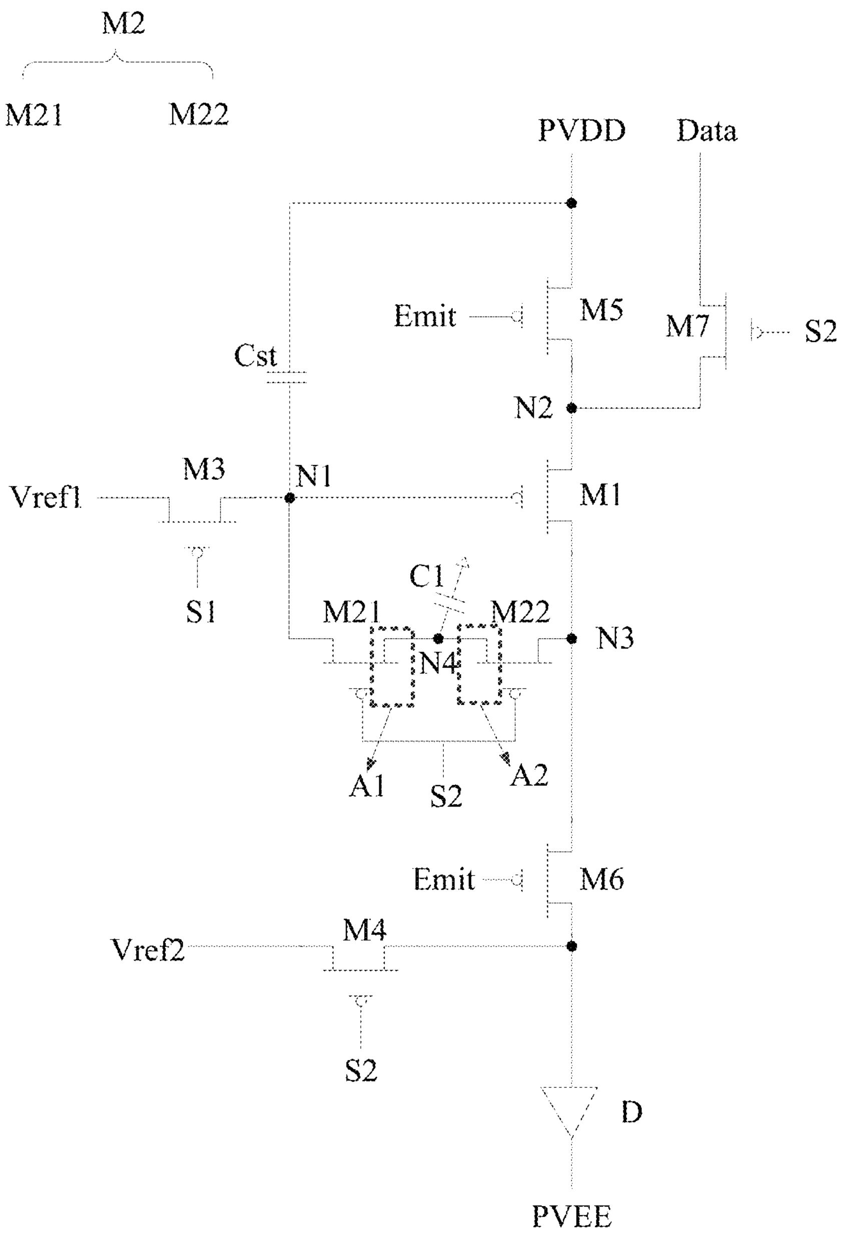
FIG. 1 illustrates a schematic structural diagram of a pixel circuit consistent with the disclosed embodiments of the present disclosure.

To make the objectives, technical solutions and advantages of the present disclosure clearer and more explicit, the present disclosure is described in further detail with accompanying drawings and embodiments. It should be understood that the specific exemplary embodiments described herein are only for explaining the present disclosure and are not intended to limit the present disclosure.

Technologies, methods, and equipment known to those of ordinary skill in relevant fields may not be discussed in detail, but where appropriate, these technologies, methods, and equipment should be regarded as part of the present disclosure.

It should be noted that in the present disclosure, when an element (such as a layer, a film, a region, or a substrate) is referred to as being "over" another element, the element may be directly on the other element, or intervening elements may be present. In addition, in the present disclosure, when an element is described as being "connected" to another element, the element may be "directly connected" to the other element, or "connected" to the other element through a third element.

Directional or positional relationships indicated by terms, such as "upper", "lower", "top", "bottom", "inner", and "outer", are based on the directional or positional relationships shown in the drawings. These terms are only for convenience of description, and for simplifying the description. These terms do not indicate or imply that the devices or elements referred to must have a specific orientation, be constructed and operate in a specific orientation. These terms should not be understood as a limit to the present disclosure.

It should be noted that in the present disclosure, relational terms such as "first" and "second" are only used to distinguish one entity or operation from another entity or operation, and do not necessarily require or imply that such actual relationship or sequence exists between these entities or operations. Terms "comprise", "include" or any other variations thereof are intended to cover a non-exclusive inclusion. A process, method, article, or apparatus that includes a series of elements includes not only the series of elements, but also other elements not expressly listed, or elements inherent to such a process, method, article, or apparatus. Without further limitation, an element defined by a statement like "comprises a . . . " does not exclude the presence of additional identical elements in a process, method, article, or apparatus that includes the foregoing element. In the present disclosure, that layer A and layer B are "disposed on a same layer" means that layer A and layer B are made of a same material and in a same process.

Reference will now be made in detail to embodiments of the present disclosure, which are illustrated in the accompanying drawings. Similar labels and letters designate similar items in the drawings. Once an item is defined in one drawing, the item may not be defined and discussed in subsequent drawings.

The present disclosure provides a pixel circuit. FIG. 1 illustrates a schematic structural diagram of a pixel circuit consistent with the disclosed embodiments of the present disclosure. Referring to FIG. 1, the pixel circuit includes a driving transistor M1 and a threshold compensation transistor M2. The driving transistor M1 is configured to provide driving current to a light emitting element D.

The threshold compensation transistor M2 is connected between the gate of the driving transistor M1 (the first node N1 in FIG. 1) and the first electrode of the driving transistor (which may be the drain of the driving transistor, the third node N3 in FIG. 1). The driving transistor also includes a second electrode, such as the second node N2 in FIG. 1. The second electrode of the driving transistor is configured to receive and transmit a data signal.

The threshold compensation transistor M2 is configured to detect and compensate for the deviation of the threshold voltage of the driving transistor M1. That is, when the threshold compensation transistor M2 is turned on, the gate of the driving transistor M1 may be electrically connected to the first electrode of the driving transistor M1, and the threshold voltage Vth of the driving transistor M1 may be captured.

In one embodiment, the threshold compensation transistor M2 includes a first sub-threshold compensation transistor M21 and a second sub-threshold compensation transistor M22. The first electrode of the first sub-threshold compensation transistor M21 is electrically connected to the gate of the driving transistor M1. The second electrode of the first sub-threshold compensation transistor M21 is electrically connected to the first electrode of the second sub-threshold compensation transistor M22. The second electrode of the second sub-threshold compensation transistor M22 is electrically connected to the first electrode of the driving transistor M1. The gate of the first sub-threshold compensation transistor M21 and the gate of the second sub-threshold compensation transistor M22 are electrically connected. In one embodiment, the threshold compensation transistor M2 is a dual-gate transistor. As such, the leakage current from the threshold compensation transistor M2 to the gate of the driving transistor M1 may be reduced, and the stability of the gate potential of the driving transistor M1 may thus be improved.

Figure 2:
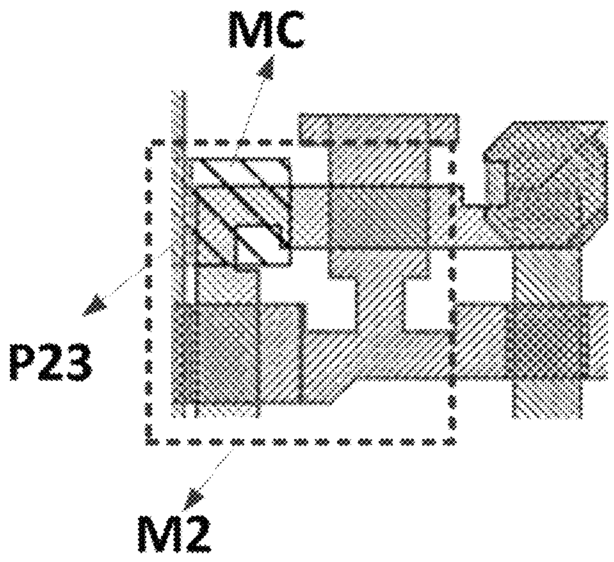
FIG. 2 illustrates a schematic layout diagram of a threshold compensation transistor in a pixel circuit shown in FIG. 1, consistent with the disclosed embodiments of the present disclosure.
Figure 3:
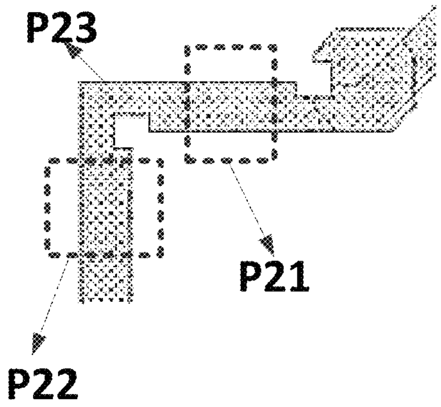
FIG. 3 illustrates a schematic diagram of a layout structure of an active layer of a threshold compensation transistor shown in FIG. 2, consistent with the disclosed embodiments of the present disclosure.
Figure 4:
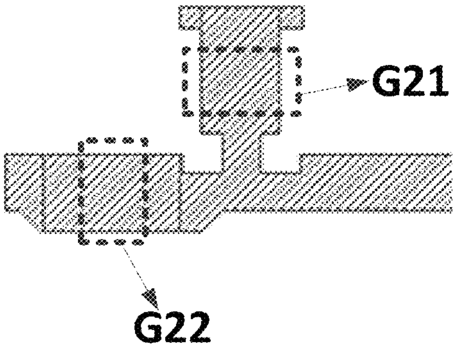
FIG. 4 illustrates a schematic diagram of a layout structure of a film layer where a gate metal of a threshold compensation transistor shown in FIG. 2 is located, consistent with the disclosed embodiments of the present disclosure.
Figure 5:
FIG. 5 illustrates a schematic diagram of a layout structure of a film layer where a shielding layer shown in FIG. 2 is located, consistent with the disclosed embodiments of the present disclosure.

FIG. 2 illustrates a schematic layout diagram of a threshold compensation transistor in a pixel circuit shown in FIG. 1. FIG. 3 illustrates a schematic diagram of a layout structure of an active layer of a threshold compensation transistor shown in FIG. 2. FIG. 4 illustrates a schematic diagram of a layout structure of a film layer where a gate metal of a threshold compensation transistor shown in FIG. 2 is located. FIG. 5 illustrates a schematic diagram of a layout structure of a film layer where a shielding layer shown in FIG. 2 is located.

Referring to FIGS. 1-5, the active layer of the threshold compensation transistor M2 includes a first sub-channel region P21, a second sub-channel region P22, and a first connection region P23. The first sub-channel region P21 and the second sub-channel region P22 are electrically connected through the first connection region P23.

Referring to FIGS. 1-5, the first sub-channel region P21 is the channel region of the first sub-threshold compensation transistor M21. In a direction perpendicular to the active layer, the first sub-channel region P21 at least partially overlaps with the gate metal of the threshold compensation transistor. The region where the gate metal of the threshold compensation transistor overlaps with the first sub-channel region P21 is the gate G21 of the first sub-threshold compensation transistor M21. That is, in the direction perpendicular to the active layer, the first sub-channel region P21 at least partially overlaps with the gate G21 of the first sub-threshold compensation transistor M21.

Referring to FIGS. 1-5, the second sub-channel region P22 is the channel region of the second sub-threshold compensation transistor M22. In the direction perpendicular to the active layer, the second sub-channel region P22 at least partially overlaps with the gate metal of the threshold compensation transistor. The region where the gate metal of the threshold compensation transistor overlaps with the second sub-channel region P22 is the gate G22 of the second sub-threshold compensation transistor M22. That is, in the direction perpendicular to the active layer, the second sub-channel region P22 at least partially overlaps with the gate G22 of the second sub-threshold compensation transistor M22.

Referring to FIG. 5, in one embodiment, the pixel circuit also includes a shielding layer. In the direction perpendicular to the active layer, the first connection region P23 overlaps the shielding layer.

In the direction perpendicular to the active layer, the first connection region P23 overlaps the shielding layer MC, and a shielding capacitor C1 may be formed. The first electrode of the first sub-threshold compensation transistor M21 and the gate of the driving transistor M1 are electrically connected to the scan line S2. When the electric potential on the scan line S2 changes, the electric potential at the position (the fourth node N4 in FIG. 1) where the second electrode of the first sub-threshold compensation transistor M21 and the first electrode of the second sub-threshold compensation transistor M22 are electrically connected may change. Because of the shielding capacitor C1, when the electric potential on the scan line S2 changes, the charge at the fourth node N4 may be stored in the shielding capacitor C1, avoiding the charge at the fourth node N4 from being injected into the first node N1. As such, the stability of the gate potential of the driving transistor M1 may be maintained, and the driving current generated by the driving transistor M1 may be stabilized. Accordingly, the display uniformity of the display panel may be improved.

The potential change on the scan line S2 may make the potential difference between the fourth node N4 and the first node N1 to be large. As a result, the potential of the fourth node N4 may affect the potential stability of the first node N1, resulting in the display flicker problem. To avoid the display flicker problem, in one embodiment, the overlapping area A of the first connection area and the shielding layer satisfies the following formulas:

$$A > C_{p1} * \left( \frac{|V_{g1} - V_{01}|}{N1 + a1 - V_{01}} - 1 \right) * \frac{d1}{\varepsilon 1};$$

$$C_{p1} = C_{ox1} * \left( \frac{W1 * L1}{2} + \frac{W2 * L2}{2} \right),$$

where: $C_{ox1}$ is the capacitance per unit area of the metal-insulator-semiconductor (MIS) structure of the threshold compensation transistor; $V_{01}$ is the gate potential of the driving transistor before the threshold compensation transistor is turned off; d1 is the thickness of the insulation layer between the shielding layer and the first connection area, ε1 is the relative dielectric constant of the insulation layer between the shielding layer and the first connection area; N1 is the gate potential of the driving transistor before the pixel circuit drives the pixel to emit light; $V_{g1}$ is the gate potential of the threshold compensation transistor after the threshold compensation transistor is turned off; a1 is a preset constant; W1 is the channel width of the first sub-threshold compensation transistor; L1 is the channel length of the first sub-threshold compensation transistor; W2 is the channel width of the second sub-threshold compensation transistor; and L2 is the channel length of the second sub-threshold compensation transistor.

It should be noted that, in one embodiment, as an example, each transistor in the pixel circuit may be taken as a P-type transistor. In some other embodiments, each transistor of the pixel circuit may be selected as a P-type transistor or an N-type transistor according to requirements. The transistors in the pixel circuit may each be P-type transistors; or the transistors in the pixel circuit may each be N-type transistors. Alternatively, a part of the transistors in the pixel circuit may be P-type transistors, and another part of the transistors in the pixel circuit may be N-type transistors. In the following embodiments, as an example for description, the transistors each are P-type transistors and are turned on under a low-level signal.

The following is a description of the requirements for setting the overlapping area A between the first connection region and the shielding layer.

Since the threshold compensation transistor is connected to the gate of the driving transistor, the potential of the fourth node N4 in the threshold compensation transistor may affect the gate potential of the driving transistor. Exemplarily, the threshold compensation transistor M2 is a P-type transistor. When the potential of the scan line S2 is at a low level, the threshold compensation transistor M2 is turned on. When the potential of the scan line S2 changes from a low level to a high level, the threshold compensation transistor M2 is turned off. The change of the potential signal on the scan line S2 may cause coupling of the potential at the position (the fourth node N4 in FIG. 1) where the second electrode of the first sub-threshold compensation transistor M21 and the first electrode of the second sub-threshold compensation transistor M22 are electrically connected. When the potential of the scanning signal provided by the scan line S2 changes from a low level to a high level, the potential of the fourth node N4 may be increased.

For the fourth node N4, before the threshold compensation transistor M2 is turned off, the gate potential of the driving transistor M1 (the first node N1 in FIG. 1) is (Vdata-Vth).

When the scanning signal provided by the scan line S2 transits from a low level to a high level, the threshold compensation transistor M2 may be turned off, and the transition of the scanning signal of the scan line S2 may increase the potential of the fourth node N4. When the threshold compensation transistor M2 is not turned off, the fourth node N4 may not be coupled by the transition of the scanning signal of the scan line S2. V01 is the gate potential of the driving transistor before the initialization transistor is turned off. The voltage range for coupling the fourth node N4 is from $V_{01}$ to $V_{g1}$. $V_{g1}$ is the gate potential of the threshold compensation transistor after the threshold compensation transistor is turned off. That is, $V_{g1}$ corresponds to the high level of the scanning signal on the scan line S2.

Referring to FIG. 1, there is a transistor on each side of the fourth node N4, that is, a first sub-threshold compensation transistor M21 and a second sub-threshold compensation transistor M22. The portion of the first sub-threshold compensation transistor M21 close to the fourth node N4 (the dotted line frame A1 in FIG. 1) may cause coupling to the fourth node N4. The portion of the second sub-threshold compensation transistor M22 close to the fourth node N4 (the dotted line frame A2 in FIG. 1) may also cause coupling to the fourth node N4.

As such, the transistor capable of coupling the fourth node N4 includes a portion of the first sub-threshold compensation transistor M21 close to the fourth node N4 (at the dotted line frame A1 in FIG. 1, half of the first sub-threshold compensation transistor M21) and a portion of the second sub-threshold compensation transistor M22 close to the fourth node N4 (at the dotted line frame A2 in FIG. 1, half of the second sub-threshold compensation transistor M22). The total coupling capacitance to the fourth node N4 is:

$$C_{p1}=C_{ox1}*\left(\frac{W1*L1}{2}+\frac{W2*L2}{2}\right).$$

In one embodiment, the first connection area overlaps with the shielding layer, so the shielding capacitance formed by the overlap of the first connection area and the shielding layer is (A*ε1)/d1. As such, the total capacitance at the fourth node N4 is $C_{p2}$+ (A*ε1)/d1. According to the charge conservation and capacitance coupling principles, the coupling amount caused by the transition of the scanning signal of the scan line S1 is $C_{p1}*(V_{g1}-V_{01})$. The charge may bring a voltage change of ΔV1 to the total capacitance of the fourth node N4, that is:

$$\left(C_{p1}+\frac{A*\varepsilon 1}{d1}\right)*\Delta V1=C_{p1}*(V_{g1}-V_{01}).$$

As such, $$\Delta V1=\frac{C_{p1}*(V_{g1}-V_{01})}{\left(C_{p1}+\frac{A*\varepsilon 1}{d1}\right)}.$$

Accordingly, the potential of the fourth node N4 is:

$$\Delta V1+V_{01}=\frac{C_{p1}*(V_{g1}-V_{01})}{\left(C_{p1}+\frac{A*\varepsilon 1}{d1}\right)}+V_{01}.$$

To prevent the potential of the fourth node N4 from affecting the gate potential of the driving transistor (the potential of the first node N1), in one embodiment, the difference between the potential of the fourth node N4 and the gate potential of the driving transistor is set to be within a certain value a1, where a1 is a preset constant greater than zero, for example, 1<a1≤2. That is:

$$N1-a1<\frac{C_{p1}*(V_{g1}-V_{01})}{\left(C_{p1}+\frac{A*\varepsilon 1}{d1}\right)}+V_{01}<N1+a1$$

where, N1 represents the gate potential of the driving transistor before the pixel circuit drives the pixel to emit light. By converting the above formula, it may be obtained that the overlapping area A of the first connection area and the shielding layer satisfies:

$$C_{p1}*\left(\frac{V_{g1}-V_{01}}{N1-a1-V_{01}}-1\right)*\frac{d1}{\varepsilon 1}>A>C_{p1}*\left(\frac{V_{g1}-V_{01}}{N1+a1-V_{01}}-1\right)*\frac{d1}{\varepsilon 1}.$$

Since the threshold compensation transistor M2 is configured to write the data signal into the gate of the driving transistor M1, the potential of the fourth node N4 is equal to the gate potential N1 of the driving transistor (the potential of the first node N1) when the threshold compensation transistor M2 is turned on. It should be noted that, for the convenience of description, before the pixel circuit drives the pixel to emit light, the gate potential of the driving transistor is also represented by the numeral "N1". The subsequent transition of the scanning signal of the scan line S2 may increase the potential of the fourth node N4. As such, the potential of the fourth node N4 may be greater than the gate potential N1 of the driving transistor. From the following formula:

$$N1-a1<\frac{C_{p1}*(V_{g1}-V_{01})}{\left(C_{p1}+\frac{A*\varepsilon 1}{d1}\right)}+V_{01}<N1+a1,$$

it may be obtained that:

$$\frac{C_{p1}*(V_{g1}-V_{01})}{\left(C_{p1}+\frac{A*\varepsilon 1}{d1}\right)}+V_{01}<N1+a1.$$

As such, $$A>C_{p1}*\left(\frac{V_{g1}-V_{01}}{N1+a1-V_{01}}-1\right)*\frac{d1}{\varepsilon 1}.$$

That is, by setting the overlapping area A of the first connection area and the shielding layer to satisfy:

$$A>C_{p1}*\left(\frac{|V_{g1}-V_{01}|}{N1+a1-V_{01}}-1\right)*\frac{d1}{\varepsilon 1},$$

the difference between the potential of the fourth node N4 after coupling and the potential of the first node N1 may be controlled to be smaller than a1. As a result, the leakage current from the threshold compensation transistor to the driving transistor may be reduced.

In one embodiment, the pixel circuit may also include other transistors that support the operation of the pixel circuit. For example, referring to FIG. 1, the pixel circuit may also include an initialization transistor M3, an anode reset transistor M4, a first light-emission control transistor M5, a second light-emission control transistor M6, and a data writing transistor M7.

The pixel circuit is configured to receive the scanning signal provided by the scan line S1, the scanning signal provided by the scan line S2, the light-emitting control signal provided by the light-emitting control line Emit, the data signal provided by the data line Data, the first reset signal provided by the initialization signal line Vref1, the second reset signal provided by the reset signal line Vref2, the positive polarity power supply voltage provided by the first power line PVDD, the negative polarity power supply voltage provided by the second power line PVEE, etc. For the convenience of description, in the present disclosure, a signal transmitted by a signal line is represented by a same reference numeral as the signal line. In FIG. 1, the initialization signal line Vref1 and the reset signal line Vref2 are exemplarily configured to receive a same signal. That is, the first reset signal provided by the initialization signal line Vref1 is same as the second reset signal provided by the reset signal line Vref2. In some other embodiments, different constant-voltage signals may also be provided for the initialization signal line Vref1 and the reset signal line Vref2.

The gate of the driving transistor M1 is connected to the first node N1, the first electrode of the driving transistor M1 is connected to the second node N2, and the second electrode of the driving transistor M1 is connected to the third node N3. The first electrode of the initialization transistor M3 is connected to the initialization signal line Vref1, the second electrode of the initialization transistor M3 is connected to the first node N1, and the gate of the initialization transistor M3 is connected to the scan line S1. The first electrode of the data writing transistor M7 is connected to the data line Data, the second electrode of the data writing transistor M7 is connected to the second node N2, and the gate of the data writing transistor M7 is connected to the scan line S2. The gates of the first light emitting control transistor M5 and the second light emitting control transistor M6 each are connected to the light emitting control line Emit. The first electrode of the first light emitting control transistor M5 is connected to the first power line PVDD. The second electrode of the first light-emission control transistor M5 is connected to the second node N2. The first electrode of the second light-emission control transistor M6 is connected to the third node N3. The second electrode of the second light emitting control transistor M6 is connected to the anode of the light emitting element D. The cathode of the light emitting element D is connected to the second power line PVEE. The first electrode of the anode reset transistor M4 is connected to the reset signal line Vref2. The second electrode of the anode reset transistor M4 is connected to the anode of the light emitting element D.

The following takes the case where M1 to M7 in FIG. 1 each are P-type transistors and are turned on under a low-level signal, as an example to illustrate the operation process of the pixel circuit.

In one frame time, the display panel performs the first reset stage (initialization stage) t1, the data writing stage t2, and the light emitting stage t3. In the initialization stage t1, the scan line S1 provides a low-level signal to the initialization transistor M3, and the initialization transistor M3 is turned on. The first reset signal provided by the first initialization signal line Vref1 is transmitted to the driving transistor M1 to reset the gate of the driving transistor M1. In the data writing stage t2, the scan line S2 provides a low-level signal to the threshold compensation transistor M2, the anode reset transistor M4, and the data writing transistor M7. The threshold compensation transistor M2, the anode reset transistor M4, and the data writing transistor M7 are turned on. The data signal provided by the data line Data is written into the gate of the driving transistor M1 (the threshold value is captured when the data writing transistor M7 and the threshold compensation transistor M2 are turned on simultaneously). The second reset signal provided by the reset signal line Vref2 is transmitted to the anode of the light emitting element D, to reset the anode of the light emitting element D. When a valid level signal is transmitted on the scan line S1, the pixel circuits of a previous row enter the data writing stage, and the pixel circuits of the current row enter the reset stage. When a valid level signal is transmitted on the scan line S2, the pixel circuits of thea current row enter the data writing stage. In the light emitting stage t3, the light emitting control line Emit provides a low-level signal to the first light emitting control transistor M5 and the second light emitting control transistor M6. The first light-emission control transistor M5 and the second light-emission control transistor M6 are turned on, and the positive polarity power supply voltage provided by the first power line PVDD is transmitted to the driving transistor M1. The light emitting element D emits light in response to the driving signal of the driving transistor M1.

Each transistor in the pixel circuit may be a low-temperature polysilicon thin film transistor or an indium gallium zinc oxide thin film transistor. The present disclosure does not limit a specific type of transistor. In practical applications, the implementation of the pixel circuit may be selected based on demand, and is not limited to the pixel circuit with 7 transistors as shown in FIG. 1.

In some embodiments, $0 \leq a1 \leq 2$.

In one embodiment, the overlapping area A of the first connection area and the shielding layer meets the above formula to form the shielding capacitor C1. As such, the potential difference between the fourth node N4 after coupling and the first node N1 may be maintained approximately between 0V and 2 V. Accordingly, the leakage current to the first node N1 may be reduced, the stability of the gate potential of the driving transistor may be maintained, and the low-frequency flicker problem of the display panel may be solved.

In some embodiments, the overlapping area A of the first connection region and the shielding layer may also satisfy: $A < b1(W1*L1+W2*L2)$, where b1 is a preset constant.

Optionally, in one embodiment, the overlapping area A of the first connection region and the shielding layer satisfies: $A < b1(W1*L1+W2*L2)$. Since a large shielding capacitor plate area may result in a long switching delay time of the transistor, the overlapping area A of the first connection area and the shielding layer is set to satisfy $A < b1(W1*L1+W2*L2)$. As such, the problem of abnormal display caused by the long switching delay time of the threshold compensation transistor may be avoided.

In some embodiments, the pixel circuit may also include an initialization transistor. The initialization transistor is configured to transmit the first reset signal provided by the initialization signal line to the gate of the driving transistor in the initialization stage, to initialize the gate of the driving transistor.

Figure 6:
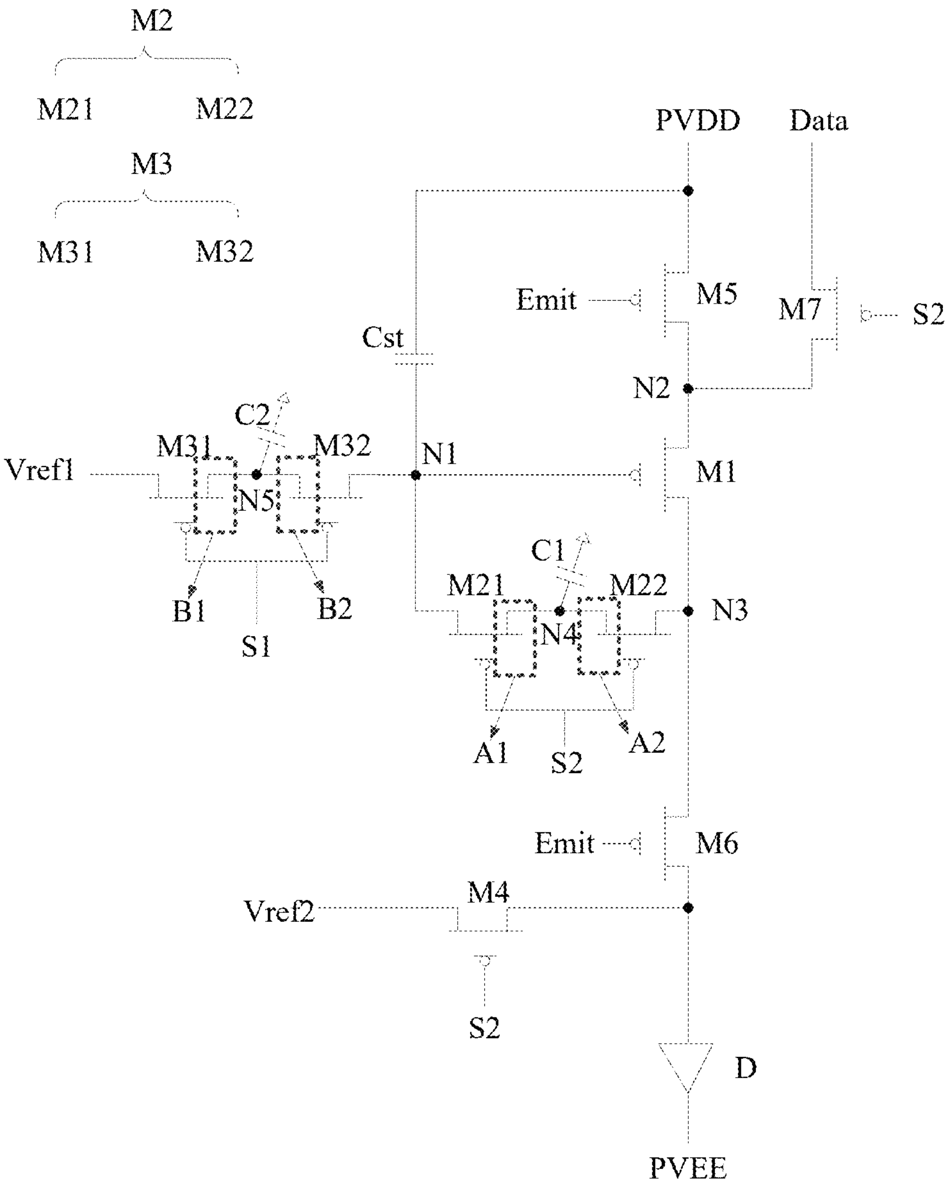
FIG. 6 illustrates a schematic structural diagram of another pixel circuit consistent with the disclosed embodiments of the present disclosure.

FIG. 6 illustrates a schematic structural diagram of another pixel circuit consistent with the disclosed embodiments of the present disclosure. As shown in FIG. 6, the initialization transistor M3 includes a first sub-initialization transistor M31 and a second sub-initialization transistor M32. The first electrode of the first sub-initialization transistor M31 is electrically connected to the initialization signal line Vref1. The second electrode of the first sub-initialization transistor M31 is electrically connected to the first electrode of the second sub-initialization transistor M32. The second electrode of the second sub-initialization transistor M32 is electrically connected to the gate of the driving transistor M1. The gate of the first sub-initialization transistor M31 and the gate of the second sub-initialization transistor M32 are electrically connected. In one embodiment, the initialization transistor M3 is a dual-gate transistor. As such, the leakage current between the initialization transistor M3 and the gate of the driving transistor M1 may be reduced, and the stability of the gate potential of the driving transistor M1 may be improved.

Figure 7:
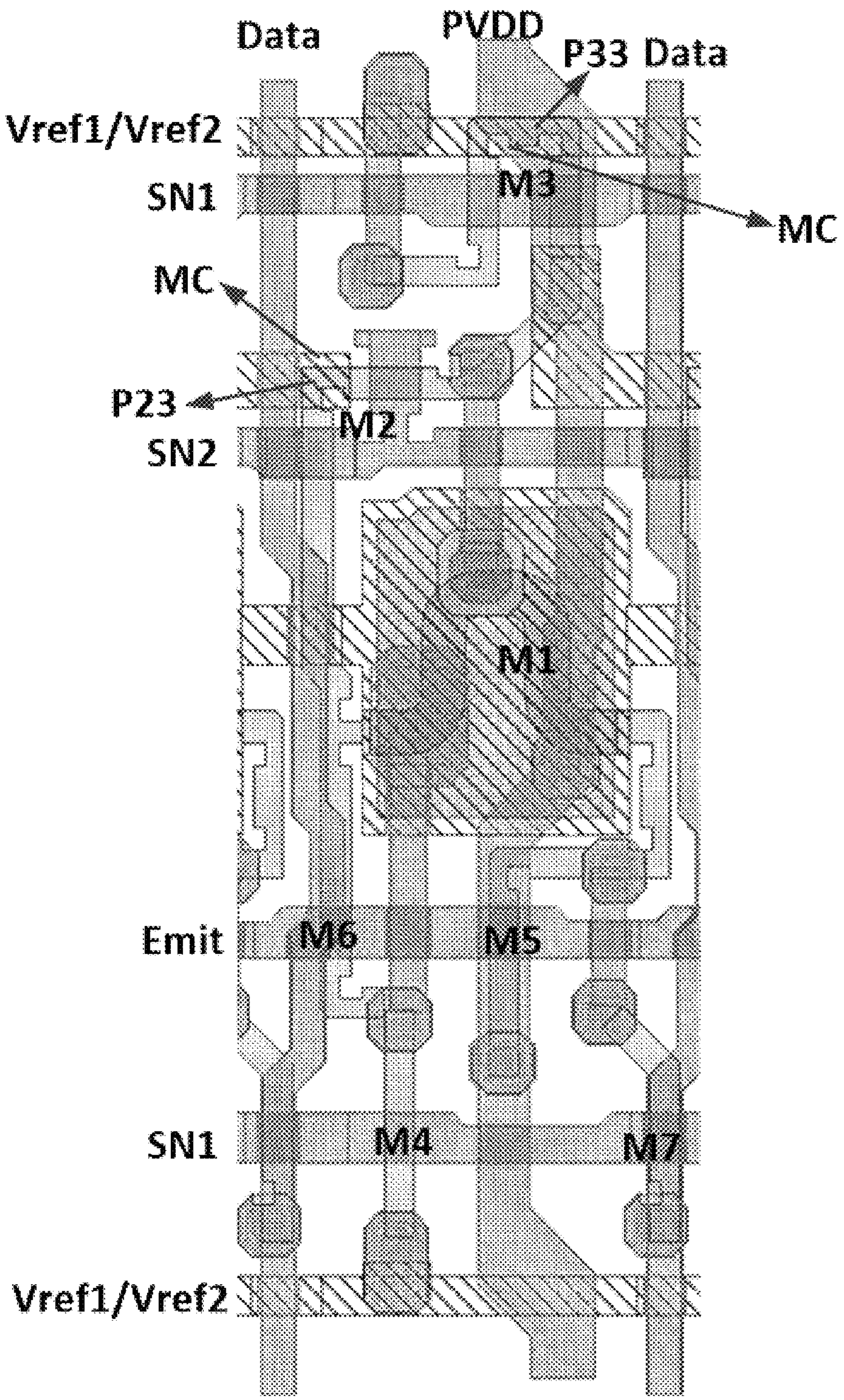
FIG. 7 illustrates a schematic diagram of a layout structure of a pixel circuit shown in FIG. 6, consistent with the disclosed embodiments of the present disclosure.
Figure 8:
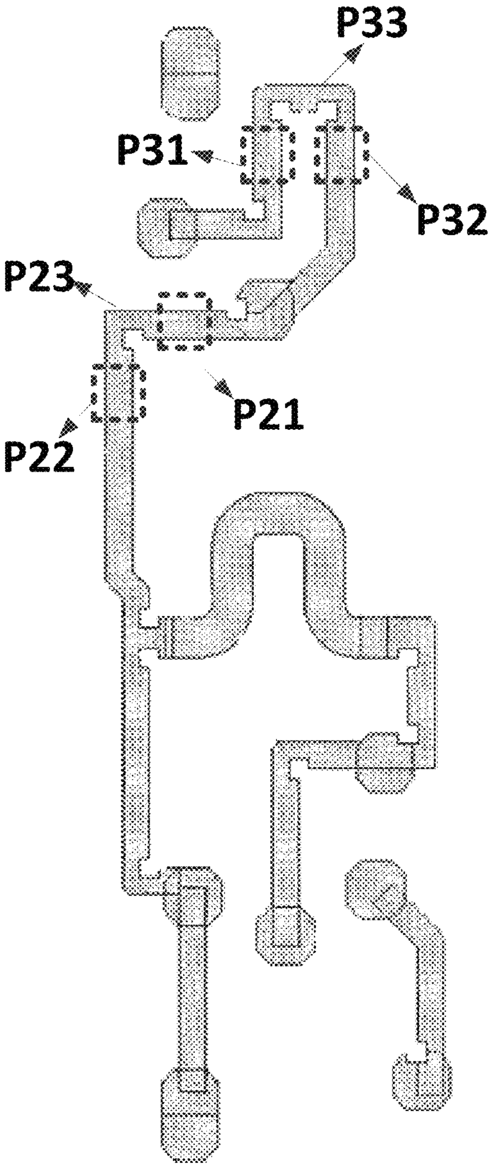
FIG. 8 illustrates a schematic diagram of a layout structure of an active layer of each transistor shown in FIG. 6, consistent with the disclosed embodiments of the present disclosure.
Figure 9:
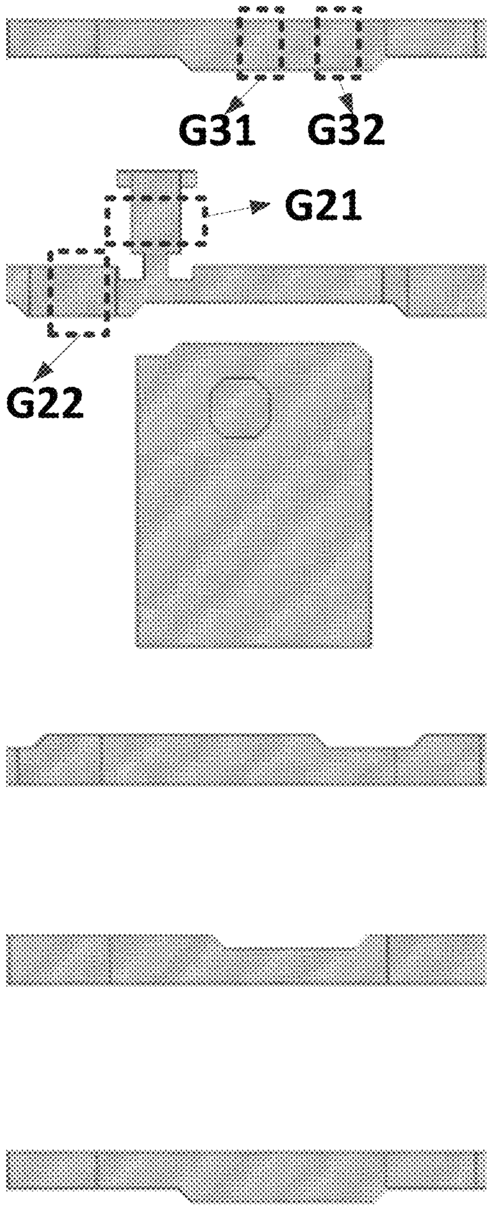
FIG. 9 illustrates a schematic diagram of a layout structure of a film layer where a gate metal of each transistor shown in FIG. 6 is located, consistent with the disclosed embodiments of the present disclosure.
Figure 10:
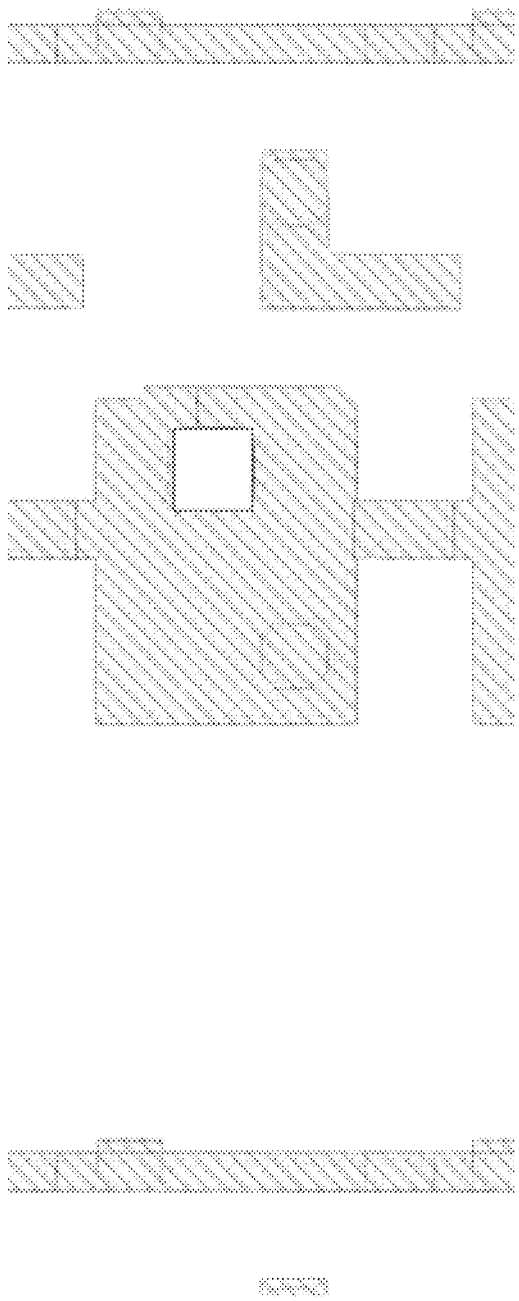
FIG. 10 illustrates a schematic diagram of a layout structure of a film layer where a shielding layer shown in FIG. 6 is located, consistent with the disclosed embodiments of the present disclosure.

FIG. 7 illustrates a schematic diagram of a layout structure of a pixel circuit shown in FIG. 6. FIG. 8 illustrates a schematic diagram of a layout structure of an active layer of each transistor shown in FIG. 6. FIG. 9 illustrates a schematic diagram of a layout structure of a film layer where a gate metal of each transistor shown in FIG. 6 is located. FIG. 10 illustrates a schematic diagram of a layout structure of a film layer where a shielding layer shown in FIG. 6 is located.

In FIGS. 6-10, the gate of each transistor, the scan lines S1 and S2, and the light emitting control line Emit are exemplarily arranged in a same layer. The initialization signal line Vref1, the reset signal line Vref2 (the initialization signal line Vref1 and the reset signal line Vref2 receive a same constant voltage signal), the capacitor metal layer, and the shielding layer are arranged in a same layer. The source of each transistor, the source and drain of each transistor, the first power line PVDD, and the data line Data are located on a same layer. It should be noted that, in FIGS. 6-10, only the film layer relationship in the area where the pixel circuit is located is illustrated, and no specific limitation is given to the film layers where different structures of the pixel circuit are located. In some other embodiments, in the condition of no short circuit, the first power line PVDD and the data line Data may be disposed at different layers.

Referring to FIGS. 6-10, the active layer of the initialization transistor M3 includes a third sub-channel region P31, a fourth sub-channel region P32, and a second connection region P33. The third sub-channel region P31 and the fourth sub-channel region P32 are electrically connected through the second connection region P33.

Referring to FIGS. 6-10, the third sub-channel region P31 is the channel region of the first sub-initialization transistor M31. In a direction perpendicular to the active layer, the third sub-channel region P31 at least partially overlaps with the gate metal of the initialization transistor. The region where the gate metal of the initialization transistor overlaps with the first sub-channel region P21 is the gate G31 of the first sub-initialization transistor M31. That is, in the direction perpendicular to the active layer, the third sub-channel region P31 at least partially overlaps with the gate G31 of the first sub-initialization transistor M31.

Referring to FIGS. 6-10, the fourth sub-channel region P32 is the channel region of the second sub-initialization transistor M32. In the direction perpendicular to the active layer, the fourth sub-channel region P32 at least partially overlaps with the gate metal of the initialization transistor. The region where the gate metal of the initialization transistor overlaps with the fourth sub-channel region P32 is the gate G32 of the second sub-threshold compensation transistor M32. That is, in the direction perpendicular to the active layer, the fourth sub-channel region P32 at least partially overlaps with the gate G32 of the second sub-initialization transistor M32.

In one embodiment, in the direction perpendicular to the active layer, the second connection region P33 overlaps with the shielding layer MC to form a shielding capacitor C2. When the potential on the scan line S1 changes, the potential at the position (the fifth node N5 in FIG. 6) where the second electrode of the first sub-initialization transistor M31 and the first electrode of the second sub-initialization transistor M32 are electrically connected may change accordingly. Because of the shielding capacitor C2, when the potential on the scan line S1 changes, the charge of the fifth node N5 may be stored in the shielding capacitor C2. As such, the charge of the fifth node N5 may be avoided from being injected into the first node N1, and the stability of the gate potential of the driving transistor M1 may be maintained. Accordingly, the driving current generated by the driving transistor M1 may be stabilized, and the display uniformity of the display panel may be improved. As a result, the charge of the fifth node N5 in FIG. 6 may be stored in the shielding capacitor C2, and the current leakage phenomenon between the fifth node N5 and the first node N1 may be alleviated.

The potential change on the scan line S1 may make the potential difference between the fifth node N5 and the first node N1 to be large. As a result, the potential of the fifth node N5 may affect the potential stability of the first node N1, resulting in the display flicker problem. To avoid the display flicker problem, in the embodiment, the overlapping area B between the second connection region and the shielding layer satisfies the following formulas:

$$C_{p2} * \left( \frac{|V_{g2} - V_{02}|}{N1 - a2 - y_{02}} - 1 \right) * \frac{d2}{\varepsilon 2} > B > C_{p2} * \left( \frac{|V_{g2} - V_{02}|}{N1 + a2 - V_{02}} - 1 \right) * \frac{d2}{\varepsilon 2};$$

$$C_{p2} = C_{ox2} * \left( \frac{W3 * L3}{2} + \frac{W4 * L4}{2} \right),$$

where: $C_{ox2}$ is the unit area capacitance of the MIS structure of the initialization transistor; $V_{02}$ is the gate potential of the driving transistor before the initialization transistor is turned off; $d_2$ is the thickness of the insulation layer between the shielding layer and the second connecting region, and ε2 is the relative dielectric constant of the insulation layer between the shielding layer and the second connecting region; N1 is the gate potential of the driving transistor before the pixel circuit drives the pixel to emit light; $V_{g2}$ is the gate potential of the initialization transistor after the initialization transistor is turned off; a2 is a preset constant; W3 is the channel width of the second sub-initialization transistor; L3 is the channel length of the second sub-initialization transistor; W4 is the channel width of the first sub-initialization transistor; and LA is the channel length of the first sub-initialization transistor.

The following is a description of the requirements for setting the overlapping area B between the second connection region and the shielding layer.

Exemplarily, the initialization transistor M3 is a P-type transistor. When the potential of the scan line S1 is at a low level, the initialization transistor M3 is turned on. The scanning signal provided by the scan line S1 transits from a low level to a high level, and the initialization transistor M3 is turned off. The transition of the scanning signal of the scan line S1 may cause coupling to the potential of the fifth node N5.

When the initialization transistor M3 is not turned off, the fifth node N5 may not be coupled by the transition of the scanning signal on the scan line S1. $V_{02}$ is the gate potential of the driving transistor M1 before the initialization transistor M3 is turned off. The voltage range for coupling the fifth node N5 is from $V_{02}$ to $V_{g2}$ ($V_{g2}$ is the gate potential of the initialization transistor after the initialization transistor is turned off, which corresponds to the high level of the scanning signal of the scan line S1).

Referring to FIG. 6, there is a transistor on each side of the fifth node N5, i.e., a first sub-initialization transistor M31 and a second sub-initialization transistor M32. The portion of the first sub-initialization transistor M31 close to the fifth node N5 (the dotted-line frame B1 in FIG. 6) may cause coupling to the fifth node N5. The portion of the second sub-initializing transistor M32 close to the fifth node N5 (the dotted-line box B2 in FIG. 6) may also cause coupling to the fifth node N5.

As such, the transistor capable of coupling the fifth node N5 includes a portion of the first sub-initialization transistor close to the fifth node N5 (at the dotted-line frame B1 in FIG. 6, half of the first sub-initialization transistor M31) and a portion of the second sub-initialization transistor close to the fifth node N5 (at the dotted-line frame B2 in FIG. 6, half of the second sub-initialization transistor M32). As such, the total coupling capacitance to the fifth node N5 is:

$$C_{p2} = C_{ox2} * \left(\frac{W3 * L3}{2} + \frac{W4 * L4}{2}\right).$$

In one embodiment, the shielding capacitance formed by the overlap of the second connection region and the shielding layer is (B*ε2)/d2. As such, the total capacitance at the fifth node N5 is $C_{p2}$+(B*ε2)/d2. According to the charge conservation and capacitance coupling principles, the coupling amount caused by the transition of the scanning signal of the scan line S1 is $C_{p2}*(V_{g2}-V_{02})$. The charge may bring a voltage change of ΔV2 to the total capacitance of the fifth node N5, that is:

$$\left(C_{p2} + \frac{B * \varepsilon 2}{d2}\right) * \Delta V2 = C_{p2} * (V_{g2} - V_{02}).$$

As such, $$\Delta V2 = \frac{C_{p2} * (V_{g2} - V_{02})}{\left(C_{p2} + \frac{B * \varepsilon 2}{d2}\right)}.$$

Accordingly, the potential of the fifth node N5 is:

$$\Delta Vx + V_{02} = \frac{C_{p2} * (V_{g2} - V_{02})}{\left(C_{p2} + \frac{B * \varepsilon 2}{d2}\right)} + V_{02}.$$

To prevent the potential of the fifth node N5 from affecting the gate potential of the driving transistor (the potential of the first node N1), in one embodiment, the difference between the potential of the fifth node N5 and the gate potential of the driving transistor is set to be within a certain value a2, where a2 is a preset constant greater than zero, for example, 1<a2≤2. That is:

$$N1 - a2 < \frac{C_{p2} * (V_{g2} - V_{02})}{C_{p2} + \frac{B * \varepsilon 2}{d2}} + V_{02} < N1 + a2,$$

where N1 represents the gate potential of the driving transistor before the pixel circuit drives the pixel to emit light. By converting the above formula, it may be obtained that the overlapping area B between the second connection region and the shielding layer satisfies:

$$C_{p2} * \left(\frac{|V_{g2} - V_{02}|}{N1 - a2 - V_{02}} - 1\right) * \frac{d2}{\varepsilon 2} > B > C_{p2} * \left(\frac{|V_{g2} - V_{02}|}{N1 + a2 - V_{02}} - 1\right) * \frac{d2}{\varepsilon 2}.$$

In one embodiment, by setting the overlapping area B between the second connection region and the shielding layer to satisfy the following formula:

$$C_{p2} * \left(\frac{|V_{g2} - V_{02}|}{N1 - a2 - V_{02}} - 1\right) * \frac{d2}{\varepsilon 2} > B > C_{p2} * \left(\frac{|V_{g2} - V_{02}|}{N1 + a2 - V_{02}} - 1\right) * \frac{d2}{\varepsilon 2},$$

the difference between the potential of the fifth node N5 after coupling and the potential of the first node N1 may be controlled to be smaller than a2. Accordingly, the leakage current between the initialization transistor and the driving transistor may be reduced.

Table 1 is a table of test results of the embodiments of the present disclosure. The shielding layer of the test panel in Table 1 is arranged on a same layer as the capacitor metal layer of the pixel circuit. The overlapping area A of the first connection area and the shielding layer satisfies A>10.85 μm, and the overlapping area B of the second connection region and the shielding layer satisfies 3.10 μm<B<21.69 μm.

TABLE 1

| Test results data table | |
|---|---|
| W1 = W2 = W3 = W4 | 2 um |
| L1 = L2 = L3 = L4 | 3.4 um |
| $V_{g1}$ | 6 V |
| $V_{01}$ | 2 V |
| N1 | 2 V |
| a1 | 2 V |
| $C_{p1}$ | 2.00E−15 |
| d1 | 2.40E−07 |
| ε1 | 4.43E−11 |
| A | A > 10.85 um |
| $V_{g2}$ | 6 V |
| $V_{02}$ | −3 V |
| N1 | 2 V |
| a2 | 2 V |
| $C_{p2}$ | 2.00E−15 |
| d2 | 2.40E−07 |
| ε2 | 4.43E−11 |
| B | 3.10 um < B < 21.69 um |

In some embodiments, the overlapping area A of the first connection region and the shielding layer, and the overlapping area B of the second connection region and the shielding layer satisfy the following formula:

$$\left\|\left[N1 - \left(Cp_2 * \frac{Cp_2}{Cp_2 + \frac{B * \varepsilon 2}{d2}} * |V_{g2} - V_{02}| + V_{02}\right)\right] - \left[\left(Cp_1 * \frac{Cp_1}{Cp_1 + \frac{A * \varepsilon 1}{d1}} * |V_{g1} - V_{01}| + V_{01}\right) - N1\right]\right\| \le b2,$$

where b2 is a preset constant.

Since the potential of the fourth node N4 is higher than the potential of the first node N1, the fourth node N4 may leak positive electricity to the first node N1. To offset the leakage of electricity from the fourth node N4 to the first node N1, in one embodiment, the overlapping area A between the first connection region and the shielding layer, and the overlapping area B between the second connection region and the shielding layer, may be set in a way, such that the fifth node N5 may leak negative electricity to the first node N1. That is, the potential difference between the first node N1 and the fifth node N5, and the potential difference between the fourth node N4 and the first node N1, may be made to be equal or close.

The potential of the fourth node N4 is:

$$Cp_1 * \frac{Cp_1}{Cp_1 + \frac{A*\varepsilon 1}{d1}} * |V_{g1} - V_{01}| + V_{01}.$$

The potential difference ΔV3 between the fourth node N4 and the first node N1 is:

$$\left(Cp_1 * \frac{Cp_1}{Cp_1 + \frac{A*\varepsilon 1}{d1}} * |V_{g1} - V_{01}| + V_{01}\right) - N1.$$

The potential of the fifth node N5 is:

$$Cp_2 * \frac{Cp_2}{Cp_2 + \frac{B*\varepsilon 2}{d2}} * |V_{g2} - V_{02}| + V_{02}.$$

The potential difference ΔV4 between the first node N1 and the fifth node N5 is:

$$N1 - \left(Cp_2 * \frac{Cp_2}{Cp_2 + \frac{B*\varepsilon 2}{d2}} * |V_{g2} - V_{02}| + V_{02}\right).$$

In the present disclosure, it is set that:

$$|\Delta V4 - \Delta V3| = \left|\left[N1 - \left(Cp_2 * \frac{Cp_2}{Cp_2 + \frac{B*\varepsilon 2}{d2}} * |V_{g2} - V_{02}| + V_{02}\right)\right] - \left[\left(Cp_1 * \frac{Cp_1}{Cp_1 + \frac{A*\varepsilon 1}{d1}} * |V_{g1} - V_{01}| + V_{01}\right) - N1\right]\right| \leq b2,$$

where b2 is a preset constant greater than or equal to zero. It should be noted that b2 may be set according to the display effect requirements of different panels, and the present disclosure does not limit a specific b2 value. The smaller the value of b2 is, the better the leakage offset effect of the fourth node N4 and the fifth node N5 on the first node N1 may be.

In some embodiments, the pixel circuit may include a third sub-initialization transistor. The first electrode of the third sub-initialization transistor is electrically connected to the initialization signal line. The second electrode of the third sub-initialization transistor is electrically connected to the second electrode of the second sub-threshold compensation transistor.

Figure 11:
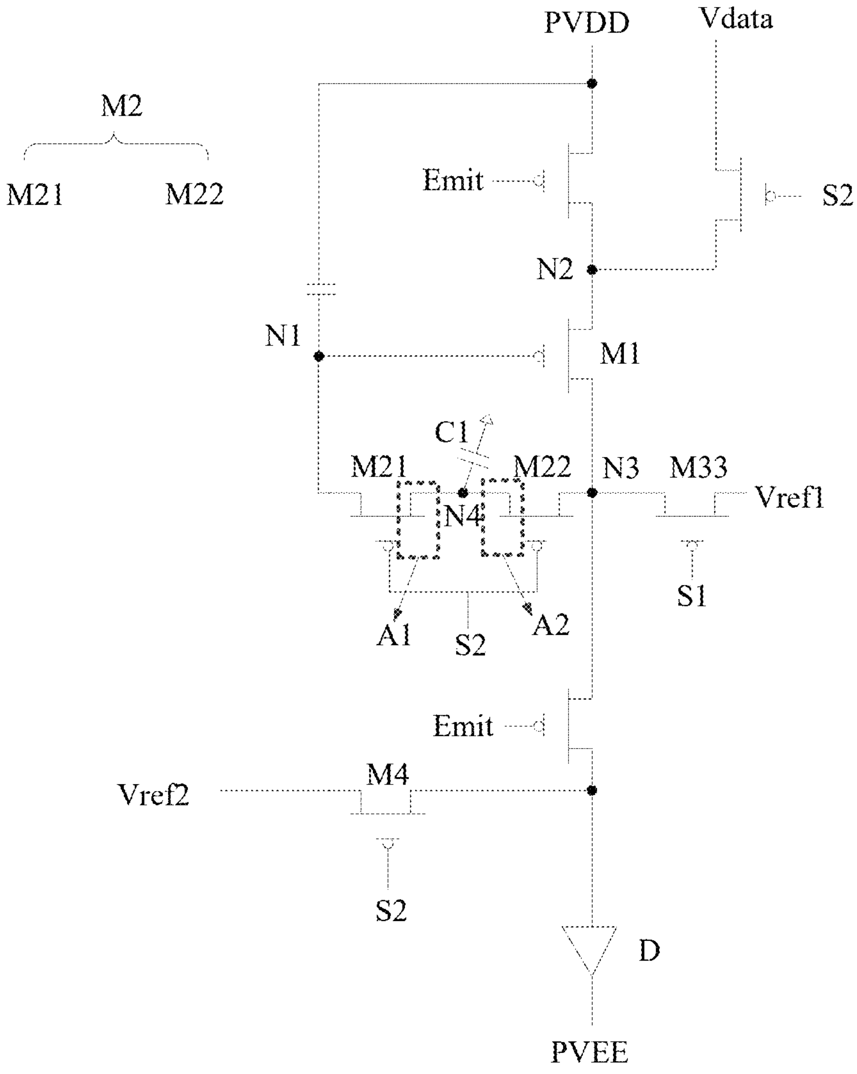
FIG. 11 illustrates a schematic structural diagram of another pixel circuit consistent with the disclosed embodiments of the present disclosure.

FIG. 11 illustrates a schematic structural diagram of another pixel circuit consistent with the disclosed embodiments of the present disclosure. As shown in FIG. 11, the pixel circuit includes a driving transistor M1, a threshold compensation transistor M2, and a third sub-initialization transistor M33. The third sub-initialization transistor M33 is a single-gate transistor. The first electrode of the third sub-initialization transistor M33 is electrically connected to the initialization signal line Vref. The second electrode of the third sub-initialization transistor M33 is electrically connected to the second electrode of the second sub-threshold compensation transistor M22. The gate of the third sub-initializing transistor M33 is connected to the scan line S1.

The threshold compensation transistor M2 includes a first sub-threshold compensation transistor M21 and a second sub-threshold compensation transistor M22. The connection way of the first sub-threshold compensation transistor M21, the second sub-threshold compensation transistor M22, and other transistors is similar to the connection way in the above embodiments, and will not be elaborated here. The structures of the active layers of the first sub-threshold compensation transistor M21 and the second sub-threshold compensation transistor M22 are also similar to the structures of the active layers in the above embodiments. The overlapping area A of the first connection area and the shielding layer also satisfies:

$$A > C_{p1} * \left(\frac{|V_{g1} - V_{01}|}{N1 + a1 - V_{01}} - 1\right) * \frac{d1}{\varepsilon 1};\ C_{p1} = C_{ox1} * \left(\frac{W1 * L1}{2} + \frac{W2 * L2}{2}\right).$$

In one embodiment, the second electrode of the third sub-initialization transistor M33 is electrically connected to the second electrode of the second sub-threshold compensation transistor M22. Since the third sub-initialization transistor M33 is no longer directly connected to the gate of the driving transistor, the problem of unstable gate potential of the driving transistor caused by the leakage current of the third sub-initialization transistor M33 may be alleviated.

In some embodiments, the shielding layer and the capacitor metal layer of the pixel circuit are disposed on a same layer.

A storage capacitor may be provided in a pixel circuit. In one embodiment, a capacitor metal layer forming a capacitor plate of the storage capacitor of the pixel circuit may be used to prepare the shielding layer. In this approach, it is not necessary to set up a separate process for forming the shielding layer. The shielding layer may be formed simultaneously when the capacitor plate of the storage capacitor of the pixel circuit is formed.

In some embodiments, the shielding layer may be disposed on a same layer as any one of the source/drain metal layer, the gate metal layer, and the light-shielding metal layer of the pixel circuit.

In one embodiment, the shielding layer may be disposed on a same layer as any one of the source/drain metal layer, the gate metal layer and the light shielding metal layer of the pixel circuit. That is, while any one of the source/drain metal layer, the gate metal layer and the light-shielding metal layer of the pixel circuit is formed, the shielding layer may be prepared by using a same metal film layer in a same process. As such, the fabrication process may be simplified, and fabrication costs may be reduced.

In some embodiments, the shielding layer may be disposed on a same layer as the metal layer that is closest to the active layer.

In one embodiment, the shielding layer is disposed on a same layer as the metal layer of the closest active layer, such that the spacing between the shielding layer and the overlapping active layer may be the smallest. According to the capacitance formula $C=\varepsilon S/d$ (C is the capacitance value, ε is the relative dielectric constant between the layers, S is the facing area of the two plates of the capacitor, and d is the spacing between the two plates of the capacitor), the smaller the spacing between the two plates of the capacitor, the larger the capacitance value. In one embodiment, the shielding layer is disposed on a same layer as the metal layer of the closest active layer. In this way, the target capacitance value of the capacitor formed by the shielding layer and the overlapping active layer may be achieved, and the capacitor plate area may be reduced, saving the pixel circuit space.

In some embodiments, the pixel circuit may also include a storage capacitor. The storage capacitor is connected between the gate of the driving transistor and the first power line.

As shown in FIGS. 1, 6 and 11, the storage capacitor Cst is connected between the gate of the driving transistor M1 and the first power line PVDD. The first plate of the storage capacitor Cst is connected to the first node N1, and the second plate of the storage capacitor Cst is connected to the first power line PVDD. The storage capacitor Cst is configured to store the data signal written into the gate of the driving transistor M1.

It should be noted that the first power line PVDD may provide a positive polarity power voltage. The display panel may also include a second power line PVEE. The second power line PVEE may provide a negative polarity power voltage. For example, the voltage range of the first power line PVDD may be approximately from 3.3V to 4.6V, and the voltage range of the second power line PVEE may be approximately from −3.5V to −2V.

In existing technology, the gate potential stability of the driving transistor is usually improved by increasing the storage capacitor. However, the storage capacitor may not be increased infinitely. In one embodiment of the present disclosure, the gate potential stability of the driving transistor may be improved by making the overlapping area A of the first connection area and the shielding layer satisfy the formula mentioned above through the approaches provided by the present disclosure, and the problem of low-frequency flickering of the display panel may be may thus be solved.

In some embodiments, the shielding layer is configured to access the power signal or the reset signal. In one embodiment, the power signal or the reset signal may be provided to the shielding layer, to provide a constant voltage signal for the shielding capacitor plate at the position where the second electrode of the first sub-threshold compensation transistor and the first electrode of the second sub-threshold compensation transistor are electrically connected (the fourth node N4 in the above embodiments), and the position where the second electrode of the first sub-initialization transistor and the first electrode of the second sub-initialization transistor are electrically connected (the fifth node N5 in the above embodiments).

The power signal may be, for example, the positive polarity power voltage transmitted by the first power line PVDD, or the negative polarity power voltage transmitted by the second power line PVEE. The reset signal may be the first reset signal transmitted by the initialization signal line Vref1 connected to the initialization transistor in the pixel circuit, or the second reset signal transmitted by the reset signal line Vref2 connected to the anode reset transistor in the pixel circuit.

In one embodiment, the constant voltage signal may be provided to the shielding layer by multiplexing an existing signal line in the pixel circuit. As such, there is no need to add an additional separate signal line to provide signals to the shielding layer.

In some implementations, the shielding layer may be connected to the positive polarity power supply voltage transmitted by the first power line PVDD, the signal transmitted by the initialization signal line Vref1 connected to the initialization transistor, or the signal transmitted by the reset signal line Vref2 connected to the anode reset transistor. Since the first power line PVDD, the initialization signal line Vref1 and the reset signal line Vref2 each are located in the display area, the shielding layer may be connected to the first power line PVDD, the initialization signal line Vref1 and the reset signal line Vref2, without wiring at the non-display area.

In some embodiments, W1/L1 is less than or equal to W2/L2. W1 is the channel width of the first sub-threshold compensation transistor; L1 is the channel length of the first sub-threshold compensation transistor; W2 is the channel width of the second sub-threshold compensation transistor; and L2 is the channel length of the second sub-threshold compensation transistor. The leakage current increases with the increase of the channel width-to-length ratio. The first sub-threshold compensation transistor is closer to the gate of the driving transistor than the second sub-threshold compensation transistor. As such, in one embodiment, the channel width-to-length ratio W1/L1 of the first sub-threshold compensation transistor close to the gate of the driving transistor is set to be less than or equal to the channel width-to-length ratio W2/L2 of the second sub-threshold compensation transistor far away from the gate of the driving transistor. In this way, the leakage current of the transistor close to the gate of the driving transistor may be reduced, and the stability of the gate potential of the driving transistor may be maintained. Accordingly, the driving current generated by the driving transistor may be stabilized, and the display uniformity of the display panel may be improved.

In some embodiments, W3/L3 is less than or equal to W4/L4. W3 is the channel width of the second sub-initialization transistor; L3 is the channel length of the second sub-initialization transistor; W4 is the channel width of the first sub-initialization transistor; and LA is the channel length of the first sub-initialization transistor. The leakage current increases with the increase of the channel width-to-length ratio. The second sub-initialization transistor is closer to the gate of the driving transistor than the first sub-initialization transistor. As such, in one embodiment, the channel width-to-length ratio W3/L3 of the second sub-initialization transistor close to the gate of the driving transistor is set to be less than or equal to the channel width-to-length ratio W4/L4 of the first sub-initialization transistor far away from the gate of the driving transistor. In this way, the leakage current of the transistor close to the gate of the driving transistor may be reduced, and the stability of the gate potential of the driving transistor may be maintained. Accordingly, the driving current generated by the driving transistor may be stabilized, and the display uniformity of the display panel may be improved.

Figure 12:
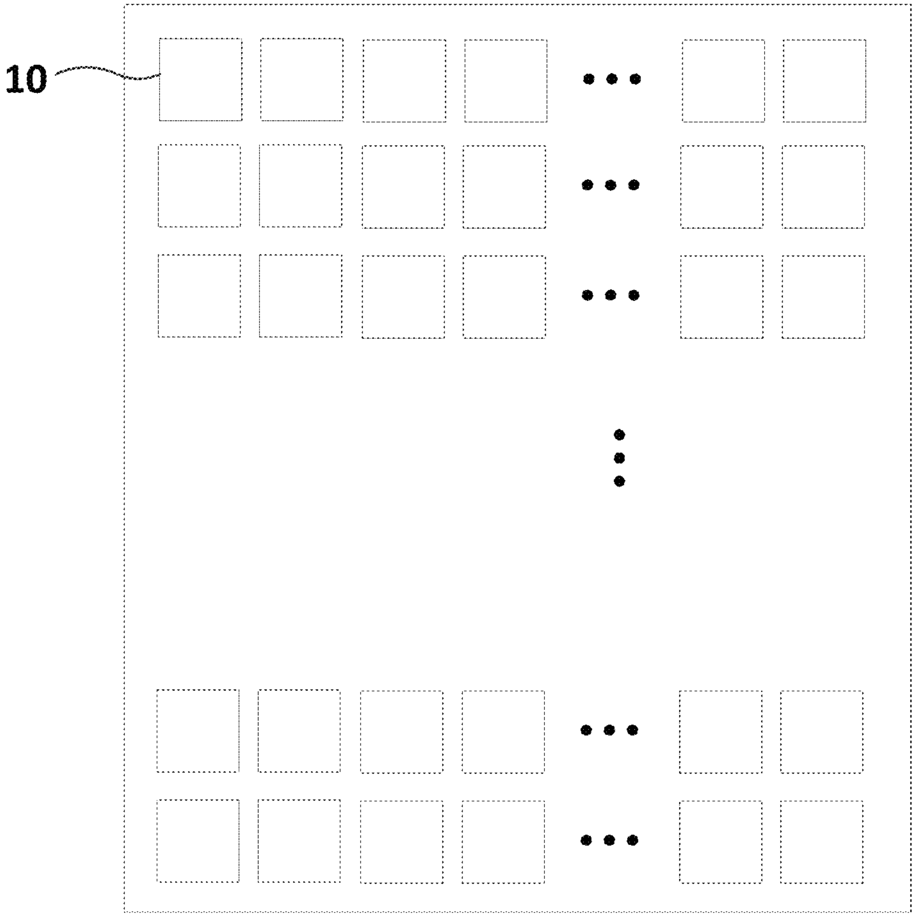
FIG. 12 illustrates a schematic structural diagram of a display panel consistent with the disclosed embodiments of the present disclosure.

The present disclosure also provides a display panel. FIG. 12 illustrates a schematic structural diagram of a display panel consistent with the disclosed embodiments of the present disclosure. As shown in FIG. 12, the display panel includes a pixel circuit 10 provided by the present disclosure. For details of the pixel circuit 10, reference may be made to the descriptions of the pixel circuit in the present disclosure, which will not be elaborated here.

Figure 13:
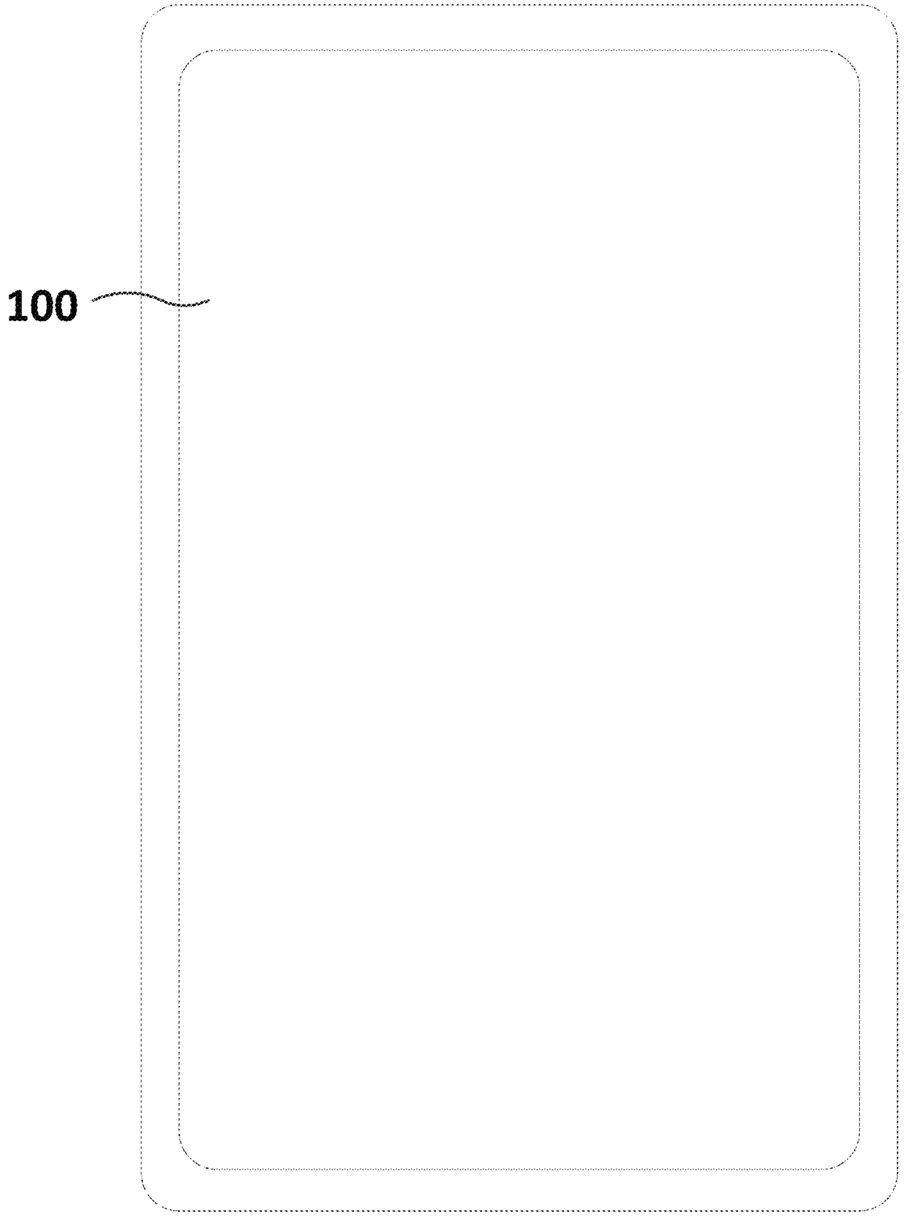
FIG. 13 illustrates a schematic structural diagram of a display device consistent with the disclosed embodiments of the present disclosure.

The present disclosure also provides a display device. FIG. 13 illustrates a schematic structural diagram of a display device consistent with the disclosed embodiments of the present disclosure. Referring to FIG. 13, the display device includes a display panel 100 provided by the present disclosure.

It may be understood that the display device provided by the present disclosure may be a computer, a mobile phone, a tablet, or other display device with display function, and the present disclosure does not limit a specific display device. The display device provided by the present disclosure has the beneficial effects of the display panel provided by the present disclosure. For details, reference may be made to the descriptions of the display panel in the present disclosure, which will not be elaborated here.

As disclosed, the technical solutions of the present disclosure have the following advantages.

The pixel circuit provided by the present disclosure includes a driving transistor and a threshold compensation transistor. The threshold compensation transistor includes a first sub-threshold compensation transistor and a second sub-threshold compensation transistor. The active layer of the threshold compensation transistor includes a first sub-channel region, a second sub-channel region and a first connection region. The first sub-channel region and the second sub-channel region are electrically connected through the first connection region. In a direction perpendicular to the active layer, the first sub-channel region at least partially overlaps with the gate of the first sub-threshold compensation transistor, and the second sub-channel region at least partially overlaps with the gate of the second sub-threshold compensation transistor. The first connection region overlaps with the shielding layer, forming a shielding capacitor. The charge at the location where the second electrode of the first sub-threshold compensation transistor is electrically connected to the first electrode of the second sub-threshold compensation transistor may be stored in the shielding capacitor.

In addition, the overlapping area A of the first connection area and the shielding layer satisfies the following formulas:

$$A > C_{p1} * \left(\frac{|V_{g1} - V_{01}|}{N1 + a1 - V_{01}} - 1\right) * \frac{d1}{\varepsilon 1};$$

$$C_{p1} = C_{ox1} * \left(\frac{W1 * L1}{2} + \frac{W2 * L2}{2}\right).$$

By setting the overlapping area A of the first connection region and the shielding layer according to the above formula, the absolute value of the difference between the potential at the position where the second electrode of the first sub-threshold compensation transistor is electrically connected to the first electrode of the second sub-threshold compensation transistor and the gate potential of the driving transistor may be less than a1. As such, the leakage current from the electrical connection position between the second electrode of the first sub-threshold compensation transistor and the first electrode of the second sub-threshold compensation transistor, to the gate of the driving transistor may be reduced. Accordingly, the stability of the gate potential of the driving transistor may be maintained, and the problem of low-frequency flickering of the display panel may be solved.

The embodiments disclosed herein are exemplary only and not limiting the scope of the present disclosure. Various combinations, alternations, modifications, equivalents, or improvements to the technical solutions of the disclosed embodiments may be obvious to those skilled in the art. Without departing from the spirit and scope of this disclosure, such combinations, alternations, modifications, equivalents, or improvements to the disclosed embodiments are encompassed within the scope of the present disclosure.

What is claimed is:

1. A pixel circuit, comprising a driving transistor, a threshold compensation transistor, and a shielding layer, wherein:

the threshold compensation transistor includes a first sub-threshold compensation transistor and a second sub-threshold compensation transistor, wherein a first electrode of the first sub-threshold compensation transistor is electrically connected to a gate of the driving transistor, a second electrode of the first sub-threshold compensation transistor is electrically connected to a first electrode of the second sub-threshold compensation transistor, a second electrode of the second sub-threshold compensation transistor is electrically connected to a first electrode of the driving transistor, and a gate of the first sub-threshold compensation transistor and a gate of the second sub-threshold compensation transistor are electrically connected;

an active layer of the threshold compensation transistor includes a first sub-channel region, a second sub-channel region, and a first connection region, wherein the first sub-channel region and the second sub-channel region are electrically connected through the first connection region;

in a direction perpendicular to the active layer of the threshold compensation transistor, the first sub-channel region at least partially overlaps with the gate of the first sub-threshold compensation transistor, and the second sub-channel region at least partially overlaps with the gate of the second sub-threshold compensation transistor;

an overlapping area A of the first connection region and the shielding layer satisfies:

$$A > C_{p1} * \left(\frac{|V_{g1} - V_{01}|}{N1 + a1 - V_{01}} - 1\right) * \frac{d1}{\varepsilon 1},$$

$$C_{p1} = C_{ox1} * \left(\frac{W1 * L1}{2} + \frac{W2 * L2}{2}\right),$$

wherein: $C_{ox1}$ is a capacitance per unit area of a metal-insulator-semiconductor (MIS) structure of the threshold compensation transistor; $V_{01}$ is a gate potential of the driving transistor before the threshold compensation transistor is turned off; d1 is a thickness of the insulation layer between the shielding layer and the first connection region, ε1 is a relative dielectric constant of the insulation layer between the shielding layer and the first connection area; N1 is a gate potential of the driving transistor before the pixel circuit drives the pixel to emit light; $V_{g1}$ is a gate potential of the threshold compensation transistor after the threshold compensation transistor is turned off; a1 is a preset constant; W1 is a channel width of the first sub-threshold compensation transistor; L1 is a channel length of the first sub-threshold compensation transistor; W2 is a channel width of the second sub-threshold compensation transistor; and L2 is a channel length of the second sub-threshold compensation transistor.

2. The pixel circuit according to claim 1, wherein the overlapping area A of the first connection region and the shielding layer further satisfies:

$A < b1(W1*L1+W2*L2)$, wherein $b1$ is a preset constant.

3. The pixel circuit according to claim 1, further comprising an initialization transistor, wherein:

the initialization transistor includes a first sub-initialization transistor and a second sub-initialization transistor, wherein a first electrode of the first sub-initialization transistor is electrically connected to an initialization signal line, a second electrode of the first sub-initialization transistor is electrically connected to a first electrode of the second sub-initialization transistor, a second electrode of the second sub-initialization transistor is electrically connected to the gate of the driving transistor, and a gate of the first sub-initialization transistor and a gate of the second sub-initialization transistor are electrically connected;

an active layer of the initialization transistor includes a third sub-channel region, a fourth sub-channel region, and a second connection region, wherein the third sub-channel region and the fourth sub-channel region are electrically connected through the second connection region;

in a direction perpendicular to the active layer of the initialization transistor, the third sub-channel region at least partially overlaps with the gate of the first sub-initialization transistor, and the fourth sub-channel region at least partially overlaps with the gate of the second sub-initialization transistor; and an overlapping area B between the second connection region and the shielding layer satisfies:

$$C_{p2}*\left(\frac{|V_{g2}-V_{02}|}{N1-a2-V_{02}}-1\right)*\frac{d2}{\varepsilon 2}>B>C_{p2}*\left(\frac{|V_{g2}-V_{02}|}{N1+a2-V_{02}}-1\right)*\frac{d2}{\varepsilon 2},$$

$$C_{p2}=C_{ox2}*\left(\frac{W3*L3}{2}+\frac{W4*L4}{2}\right),$$

wherein: $C_{ox2}$ is a unit area capacitance of a metal-insulator-semiconductor (MIS) structure of the initialization transistor; $V_{02}$ is a gate potential of the driving transistor before the initialization transistor is turned off; $d_2$ is a thickness of the insulation layer between the shielding layer and the second connecting region, and ε2 is a relative dielectric constant of the insulation layer between the shielding layer and the second connecting region; N1 is a gate potential of the driving transistor before the pixel circuit drives the pixel to emit light; $V_{g2}$ is a gate potential of the initialization transistor after the initialization transistor is turned off; a2 is a preset constant; W3 is a channel width of the second sub-initialization transistor; L3 is a channel length of the second sub-initialization transistor; W4 is a channel width of the first sub-initialization transistor; and L4 is a channel length of the first sub-initialization transistor.

4. The pixel circuit according to claim 3, wherein:

the overlapping area A of the first connection region and the shielding layer, and the overlapping area B of the second connection region and the shielding layer satisfy:

$$\left[N1-\left(Cp_2*\frac{Cp_2}{Cp_2+\frac{B*\varepsilon 2}{d2}}*|V_{g2}-V_{02}|+V_{02}\right)\right]-\left[\left(Cp_1*\frac{Cp_1}{Cp_1+\frac{A*\varepsilon 1}{d1}}*|V_{g1}-V_{01}|+V_{01}\right)-N1\right]\leq b2,$$

where b2 is a preset constant.

5. The pixel circuit according to claim 3, wherein: W3/L3 is less than or equal to W4/L4.

6. The pixel circuit according to claim 1, wherein: 0≤a1≤2.

7. The pixel circuit according to claim 1, further comprising a third sub-initialization transistor, wherein:

a first electrode of the third sub-initialization transistor is electrically connected to an initialization signal line; and a second electrode of the third sub-initialization transistor is electrically connected to the second electrode of the second sub-threshold compensation transistor.

8. The pixel circuit according to claim 7, wherein:

the threshold compensation transistor is a dual-gate transistor, and the third sub-initialization transistor is a single-gate transistor.

9. The pixel circuit according to claim 1, wherein:

the shielding layer and a capacitor metal layer of the pixel circuit are disposed on a same layer.

10. The pixel circuit according to claim 1, wherein:

the shielding layer is disposed on a same layer as one of a source/drain metal layer, a gate metal layer, and a light-shielding metal layer of the pixel circuit.

11. The pixel circuit according to claim 1, wherein:

the shielding layer is disposed on a same layer as a metal layer that is closest to the active layer.

12. The pixel circuit according to claim 1, further comprising a storage capacitor, wherein:

the storage capacitor is connected between the gate of the driving transistor and a first power line.

13. The pixel circuit according to claim 1, wherein:

the shielding layer is configured to access a power signal or a reset signal.

14. The pixel circuit according to claim 13, wherein:

the shielding layer is connected to a first power line, an initialization signal line connected to an initialization transistor, or a reset signal line connected to an anode reset transistor.

15. The pixel circuit according to claim 1, wherein: W1/L1 is less than or equal to W2/L2.

16. The pixel circuit according to claim 1, further comprising:

operation-supporting transistors, including an initialization transistor, an anode reset transistor, a first light-emission control transistor, a second light-emission control transistor, or a data writing transistor.

17. A display panel, comprising a pixel circuit including a driving transistor, a threshold compensation transistor and a shielding layer, wherein:

the threshold compensation transistor includes a first sub-threshold compensation transistor and a second sub-threshold compensation transistor, wherein a first electrode of the first sub-threshold compensation transistor is electrically connected to a gate of the driving transistor, a second electrode of the first sub-threshold compensation transistor is electrically connected to a first electrode of the second sub-threshold compensation transistor, a second electrode of the second sub-threshold compensation transistor is electrically connected to a first electrode of the driving transistor, and a gate of the first sub-threshold compensation transistor and a gate of the second sub-threshold compensation transistor are electrically connected;

an active layer of the threshold compensation transistor includes a first sub-channel region, a second sub-channel region, and a first connection region, wherein the first sub-channel region and the second sub-channel region are electrically connected through the first connection region;

in a direction perpendicular to the active layer of the threshold compensation transistor, the first sub-channel region at least partially overlaps with the gate of the first sub-threshold compensation transistor, and the second sub-channel region at least partially overlaps with the gate of the second sub-threshold compensation transistor;

an overlapping area A of the first connection region and the shielding layer satisfies:

$$A > C_{p1} * \left( \frac{|V_{g1} - V_{01}|}{N1 + a1 - V_{01}} - 1 \right) * \frac{d1}{\varepsilon 1},$$

$$C_{p1} = C_{ox1} * \left( \frac{W1 * L1}{2} + \frac{W2 * L2}{2} \right),$$

wherein: $C_{ox1}$ is a capacitance per unit area of a metal-insulator-semiconductor (MIS) structure of the threshold compensation transistor; $V_{01}$ is a gate potential of the driving transistor before the threshold compensation transistor is turned off; d1 is a thickness of the insulation layer between the shielding layer and the first connection region, ε1 is a relative dielectric constant of the insulation layer between the shielding layer and the first connection area; N1 is a gate potential of the driving transistor before the pixel circuit drives the pixel to emit light; $V_{g1}$ is a gate potential of the threshold compensation transistor after the threshold compensation transistor is turned off; a1 is a preset constant; W1 is a channel width of the first sub-threshold compensation transistor; L1 is a channel length of the first sub-threshold compensation transistor; W2 is a channel width of the second sub-threshold compensation transistor; and L2 is a channel length of the second sub-threshold compensation transistor.

18. The pixel panel according to claim 17, wherein the overlapping area A of the first connection region and the shielding layer further satisfies:

$A < b1(W1*L1+W2*L2)$, wherein $b1$ is a preset constant.

19. A display device, comprising a display panel, wherein the display panel includes a pixel circuit, and the pixel circuit includes a driving transistor, a threshold compensation transistor and a shielding layer, wherein:

the threshold compensation transistor includes a first sub-threshold compensation transistor and a second sub-threshold compensation transistor, wherein a first electrode of the first sub-threshold compensation transistor is electrically connected to a gate of the driving transistor, a second electrode of the first sub-threshold compensation transistor is electrically connected to a first electrode of the second sub-threshold compensation transistor, a second electrode of the second sub-threshold compensation transistor is electrically connected to a first electrode of the driving transistor, and a gate of the first sub-threshold compensation transistor and a gate of the second sub-threshold compensation transistor are electrically connected;

an active layer of the threshold compensation transistor includes a first sub-channel region, a second sub-channel region, and a first connection region, wherein the first sub-channel region and the second sub-channel region are electrically connected through the first connection region;

in a direction perpendicular to the active layer of the threshold compensation transistor, the first sub-channel region at least partially overlaps with the gate of the first sub-threshold compensation transistor, and the second sub-channel region at least partially overlaps with the gate of the second sub-threshold compensation transistor;

an overlapping area A of the first connection region and the shielding layer satisfies:

$$A > C_{p1} * \left( \frac{|V_{g1} - V_{01}|}{N1 + a1 - V_{01}} - 1 \right) * \frac{d1}{\varepsilon 1},$$

$$C_{p1} = C_{ox1} * \left( \frac{W1 * L1}{2} + \frac{W2 * L2}{2} \right),$$

wherein: $C_{ox1}$ is a capacitance per unit area of a metal-insulator-semiconductor (MIS) structure of the threshold compensation transistor; $V_{01}$ is a gate potential of the driving transistor before the threshold compensation transistor is turned off; d1 is a thickness of the insulation layer between the shielding layer and the first connection region, ε1 is a relative dielectric constant of the insulation layer between the shielding layer and the first connection area; N1 is a gate potential of the driving transistor before the pixel circuit drives the pixel to emit light; $V_{g1}$ is a gate potential of the threshold compensation transistor after the threshold compensation transistor is turned off; a1 is a preset constant; W1 is a channel width of the first sub-threshold compensation transistor; L1 is a channel length of the first sub-threshold compensation transistor; W2 is a channel width of the second sub-threshold compensation transistor; and L2 is a channel length of the second sub-threshold compensation transistor.

20. The display device according to claim 19, wherein the overlapping area A of the first connection region and the shielding layer further satisfies:

$A < b1(W1*L1+W2*L2)$, wherein $b1$ is a preset constant.

* * * * *